United States Patent [19]
Benward et al.

[11] Patent Number: 6,063,433
[45] Date of Patent: May 16, 2000

[54] HEALTHY BABY INFANT FORMULA BEVERAGE AND HEALTHY BABY TODDLER FORMULA BEVERAGE

[76] Inventors: Marguerite F. Benward; Wallace Benward, both of 7503 Solano St., Carlsbad, Calif. 92009

[21] Appl. No.: 08/696,655

[22] Filed: Aug. 14, 1996

[51] Int. Cl.[7] .................................. A23L 1/19; A23L 2/38
[52] U.S. Cl. .............................. 426/801; 426/72; 426/74; 426/580; 426/590
[58] Field of Search ................................. 426/72, 74, 580, 426/801, 590

[56] References Cited

U.S. PATENT DOCUMENTS 4,710,387  12/1987  Uiterwaal et al. ...................... 426/801
5,443,830  8/1995  Moore et al. ........................... 426/590

FOREIGN PATENT DOCUMENTS 30795664  4/1997  Japan ..................................... 426/801

OTHER PUBLICATIONS

Watt et al. 1975. Composition of Foods, USDA Gov. Printing Office, p. 96.

Primary Examiner—Helen Pratt

[57] ABSTRACT

A beverage mixture for infants and toddlers containing goat milk, rice milk and aloe vera juice and distilled water which is free of refined sugar and cow milk.

10 Claims, No Drawings

HEALTHY BABY INFANT FORMULA BEVERAGE AND HEALTHY BABY TODDLER FORMULA BEVERAGE

BACKGROUND—INVENTION FIELD

This invention relates to the commercial beverage known as "baby formula".

B/G—PRIOR ART DISCUSSION

The following describes a completely unique product in the baby formula arena as all of the other baby formulas commercially available are based on either cow milk or soybeans, and sweetened with refined sugar. Many are infused with unbioassimilateable ferrous iron when claiming to provide iron. These ingredients are not recommended by many professional clinical nutritionists because of their immediate and long-term allergy-producing and/or discomfort-producing potential.

This invention also solves the problem of babies and toddlers having to drink said commercially-available formulas that taste terrible simply because there is no alternative when a milk-type beverage that can be bottle-fed is required.

OBJECT & ADVANTAGES

Accordingly, several objects and advantages of our invention are:

(a.) to provide better assimilateability because it is based on goat milk which is much more similar in chemical composition to human milk and, therefore more absorbable, than cow milk;

(b.) to provide natural sweetness by inclusion of organic rice milk, eliminating the need for the addition of refined sugar which is often a significant contributor to systemic yeast overgrowth and additionally provides complex carbohydrates;

(c.) to provide aloe vera juice which has been anecdotally documented by its manufacturer to provide a soothing effect on the digestive system;

(d.) to provide a beverage that will encourage daily bowel movements, while significantly eliminating constipation and diarrhea;

(e.) to generally eliminate the gastro-intestinal discomfort such as but not limited to colic, gas, and vomiting of infants and toddlers that are often formula-related;

(f.) to provide a beverage that will contribute to the inhibition of the growth of systemic yeast, by eliminating the ingestion of refined sugar, that often contributes to such childhood symptoms as frequent ear infections and colic;

(g.) to provide a beverage that does not cause a toxic allergic reaction such that the child's body begins to retain water in an effort to dilute said toxicity resulting from the ingestion of the said commonly-used ingredients of cow milk, soy milk, refined sugar, and un-bioassimilateable iron. This retention often results in a puffy, florid, "Michilin Man"—type-appearing weight gain;

(h.) to provide vitamins and minerals, including bioavailable iron, through inclusion of a high-quality infant or toddler vitamin/mineral product to each beverage recipe;

(i.) to provide a beverage formulated specifically for nutritional requirements of infants and toddlers, birth to 12 months and 1 year to 4 years, respectively; and (j.) to provide a beverage that tastes and feels significantly similar to breast milk so that babies and toddlers have no aversion to drinking it.

Still further objects and advantages will become apparent from a consideration of the ensuing description.

DESCRIPTION OF INVENTION

This unique beverage is a mixture of commercially available products combined in such a way as to provide a baby and toddler beverage that:

(a) tastes and feels like breast milk:

(b) is free from the commonly used allergy-inducing, discomfort-producing ingredients such as refined sugar, cow milk, and soy milk;

(c) provides all the vitamin and mineral supplementation required by babies and toddlers;

(d) encourages increased bowel elimination; and (e) is formulated to correspond to baby and toddler eating patterns, respectively.

The preferred recipe for the birth to 12-month-old infant beverage is:

A. 8 oz. RICE DREAM ENRICHED brand rice milk, Vanilla flavor (by IMAGE FOODS, Palo Alto, Calif.)

B. 8 oz. RICE DREAM ENRICHED brand rice milk, original flavor

C. 8 oz. MEYENBERG ULTRA-PASTEURIZED brand Goat Milk/Homogenized and Vitamin D (by Jackson Mitchell, Turlock, Calif.

D. 4 oz. GEORGE'S ALWAYS ACTIVE ALOE brand fractionated pure Aloe Vera juice (by Warren Laboratories, Stafford, Tex.)

E. 4 oz. ARROWHEAD DISTILLED WATER (by Arrowhead Mountain spring Water Co., division of Great Spring Waters of America, Inc. Los Angeles, Calif.)

F. ¼ ml. MAXI BABY CARE INFANT MULTI-VITAMIN drops (by Country Life, Hauppauge, N.Y.

32 oz. container package

The preferred recipe for the 1-year- to 4-year-old toddler beverage is:

A.–C. ingredients listed above

D. 8 oz. GEORGE'S ALOE VERA JUICE

E. ¼ ml. I LOVE SCHIFF CHILDREN'S MULTIVITAMIN LIQUID 32 oz. container package

SUMMARY, RAMIFICATIONS, AND SCOPE

Accordingly, the reader will see that the ingredients of these two formulations of beverage are combined in such a way that said common dietary allergens of cow milk, soy milk, and refined sugar, which usually cause discomfort for infants and toddlers whose breast milk feedings must be supplemented, are eliminated.

In addition, generally speaking, the healthful benefits accruing from the beverage formulations are many:

(a.) better feeding habits as this beverage has the taste and feel of breast milk;

(b.) steady weight gain without the florid, puffy, "Michilin Man"-type appearance so common with infants, due to the elimination of allergens;

(c.) significant elimination of systemic yeast overgrowth that often symptomizes as runny noses and other "cold"

symptoms, and ear infections, due to the elimination of refined sugar;

(d.) elimination of gastric- and colon-disturbance symptoms such as gas, colic, vomiting, constipation, and diarrhea; due to the inclusion of aloe vera juice; and (e.) encouragement of daily (if not more frequent) bowel movements without discomfort.

ADDITIONAL RAMIFICATIONS

Although the description above contains many specificities, these should not be construed as limiting the scope of this invention but as merely providing illustrations of two of the presently preferred embodiments of this invention. For example, the amount of any of the ingredients could be varied. to suit specific nutritional requirements of an individual or a particular class of individuals. Such variations might be:

(a.) 16 oz. of either vanilla or original rice milk;

(b.) 16 oz. goat milk;

(c.) 2 ml. SCHIFF CHILDREN'S MULTIVITAMIN (d.) 16 oz. distilled or mineral water;

(e.) ⅛ teaspoon Bifidus bacteria;

(f.) ½ ml. infant multivitamin supplement;-elimination of of vitamin/mineral and/or bacteria supplements;

(g.) 2 oz. aloe vera juice (other brand names) ; and (h.) elimination of aloe vera juice.

We claim:

1. A beverage mixture for infants and toddlers comprising per 32 oz.:

a) about 8–16 ounces (oz.) goat milk;

b) about 16 oz. rice milk;

c) about 2–8 oz. aloe vera juice; and d) distilled water.

2. The beverage of claim 1 further comprising vitamin and mineral supplements.

3. The beverage of claim 1 further comprising Bifidus bacteria.

4. The beverage of claim 1 which is free of soy milk.

5. The beverage of claim 1 wherein such rice milk is vanilla flavored.

6. The beverage of claim 1 comprising about 8 oz. goat milk, about 16 oz. rice milk and about 4 oz. pure aloe vera juice per 32 oz. of beverage mixture.

7. The beverage of claim 1 comprising about 8 oz. goat milk, about 16 oz. rice milk, and about 8 oz. pure aloe vera juice per 32 oz. of beverage mixture.

8. The beverage of claim 1 comprising about 8 oz. goat milk, about 16 oz. rice milk, about 4 oz. pure aloe vera juice, and a vitamin/mineral supplement, and which is free of soy milk per 32 oz. of beverage mixture.

9. The beverage of claim 1 comprising about 8 oz. goat milk, about 16 oz. rice milk, about 8 oz. pure aloe vera juice and a vitamin/mineral supplement, and which is free of soy milk per 32 oz. of beverage mixture.

10. The beverage mixture of claim 1 wherein said mixture is free of refined sugar and cow milk.

* * * * *